March 1, 1949. W. T. HARRIS 2,463,380
VIBRATOR MOVEMENT FOR ELECTRIC BELLS
Filed Dec. 6, 1946
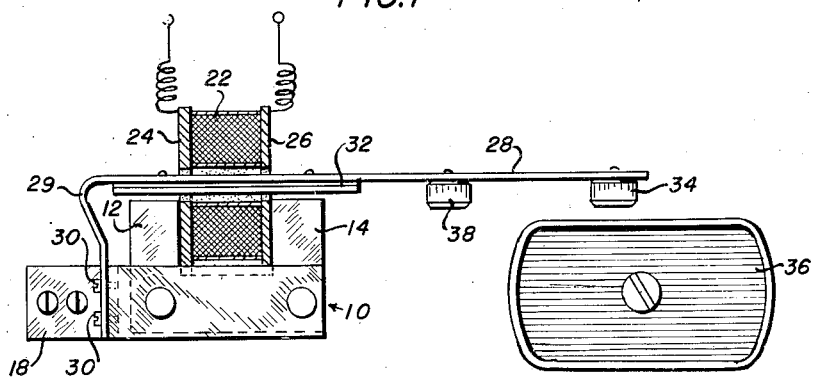
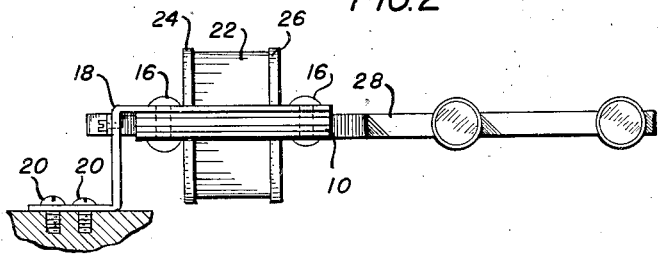
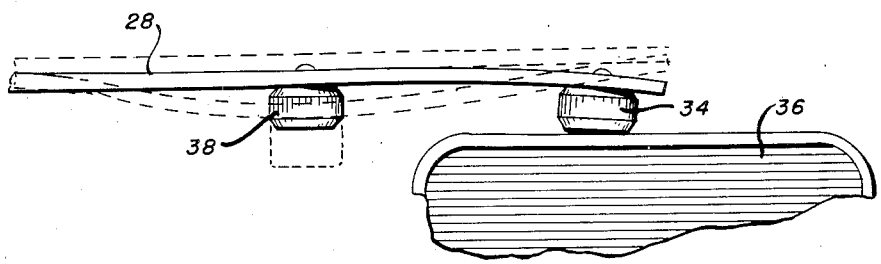
INVENTOR.
WILBUR T. HARRIS
BY
ATTY.

Patented Mar. 1, 1949

2,463,380

UNITED STATES PATENT OFFICE 2,463,380

VIBRATOR MOVEMENT FOR ELECTRIC BELLS

Wilbur T. Harris, Southbury, Conn., assignor to The United States Time Corporation, Waterbury, Conn., a corporation of Connecticut Application December 6, 1946, Serial No. 714,452

2 Claims. (Cl. 177—7)

This invention relates in general to electromagnetic devices wherein an armature is attracted to a core with a frequency which is a function of the frequency of the alternating current applied to the electromagnet.

It is an object of this invention to provide a sturdy and rugged arrangement actuated by an alternating current which will perform an operation at a frequency which is substantially lower than the frequency of the alternating current.

It is a specific object of this invention to provide a bell-ringing device which may be actuated by alternating current of a usual commercial frequency and which will require only a very minimum amount of power for its operation.

It is a further object of this invention to provide a bell-ringing device actuated by an alternating current of the usual commercial frequency, which device will be extremely simple in its operation and will produce a pleasing sound.

It is a further specific object of this invention to provide a bell-ringing system actuated by an alternating current, wherein the bell will be struck at a frequency considerably lower than the frequency of the alternating current and will therefore have a pleasing tune rather than the usual buzzing sound.

These and further objects of the invention will more readily appear as the description thereof proceeds.

Referring now to the drawing wherein:

Fig. 1 is a side elevational view, partially in section, of a bell-ringing system constructed in accordance with this invention;

Fig. 2 is a bottom view of a portion thereof;

Fig. 3 is an enlarged detail view showing the operation of the bell constructed in accordance with this invention.

In Fig. 1 is generally indicated a U-shaped member 10 having upstanding legs 12 and 14. The member 10 is formed of a magnetic material and is laminated, as clearly seen in Fig. 2, with the several laminations being held together by rivets 16 in the usual manner. To the core member 10 is fixed an angular bracket 18 which may conveniently be secured to the core by means of the rivets 16 which serve to hold the various laminations together. In use, the bracket 18 will be fixed to a stationary support by means of screws 20 or otherwise.

A coil 22, mounted between a pair of insulating plates 24 and 26, is securely fastened between the legs 12 and 14 of the core 10 in any desirable manner. As shown herein, the coil 22 is tightly wedged between the upstanding legs 12 and 14 so as to be frictionally held thereby, but obviously, any other arrangement for holding the coil 22 in position may be employed if desired.

An oscillatory or vibratory member 28 is rigidly connected to the bracket 18 by means of screws 30 or otherwise. The member 28 is resilient and has attached thereto a rigid member 32 of magnetic material. When the coil 22 is connected to a source of alternating current, an alternating electromagnetic force is produced in the magnetic circuit including the core member 10 and the rigid portion 32 of the resilient member 28, the portion 32 serving as an armature for the electromagnetic means.

The member 28 has connected to the free end thereof a work-performing weight 34, and in proximity to this work-performing weight 34 is mounted a bell 36. As the armature portion 32 oscillates or vibrates upon excitation of the coil 22, the work-performing weight or bell-ringing hammer 34 will strike the bell 36.

Mounted intermediate the free end of the member 28 and the armature portion 32 thereof is a second weight 38 for a purpose to be presently described. After the bell-ringing device has been assembled, the member 28 is tuned to a natural frequency of vibration equal to a sub-multiple of the frequency of the electromagnetic force, the frequency of the electromagnetic force being twice the frequency of the alternating current as will readily be understood.

It is a well-known fact that in an oscillating system, the higher the Q, the greater the efficiency, Q being defined as the ratio of the energy stored per cycle of operation to the energy lost per cycle of operation. It is also true that the greater the number of non-dissipating degrees of freedom, the greater will be the efficiency of an oscillating system. The system shown in Fig. 1 has three degrees of freedom, that is, the member 28 may bend at the point 29 so that the horizontal portion of member 28 moves with respect to the vertical portion thereof, the weight 34 may oscillate about the point of connection between the rigid member 32 and the member 28 as a center, and the weight 38 may move about the point of connection between the member 32 and the member 28 as a center, independently of the weight 34.

Let us assume for a moment that the member 28 is rigid throughout its length except at the point where the member 28 is attached to the bracket 18. Under these circumstances, the oscillatory system will have only one degree of freedom, that is to say, every point on the member 28 moves together or maintains its fixed relation to every other part of the member. This will result in an inefficient system and if enough power is employed, the weight 34 could be made to ring the bell 36, but such a device would not operate with an extremely small amount of power for the reason that its efficiency would be too low.

It has been pointed out as one of the objects of this invention to design a system which will operate on an extremely small amount of power and for that reason, it is necessary that the mechanical oscillator be as efficient as possible. As previously pointed out, this high efficiency is obtained by making the member 28 resilient and by the addition of the weight 38 thereto.

Describing now the operation of the bell-ringing system made in accordance with this invention, it will first be assumed that the coil 22 is connected to the ordinary commercial current of 60 cycles. A 60-cycle current will create in the magnetic circuit an electromagnetic force having a frequency of 120 cycles per second. The member 28, including the armature portion 32 and the weights 34 and 38, is tuned to have a frequency of one-fifth of that of the electromagnetic force, that is to say, with no current flowing through the coil 22, if the free end of member 28 is plucked, the member will vibrate or oscillate with a frequency of 24 cycles per second. If the current is allowed to flow through the coil 22, the member 28 will vibrate with a frequency of 24 cycles per second provided the weight 34 is free to complete its oscillations, that is, if the weight does not strike the bell 36. It has been found, however, that with the bell 36 in position so that the weight 34 will strike said bell, the frequency of the member 28 will change to one-third of the frequency of the electromagnetic force and the weight 34 will strike the bell forty times per second. The reason for this phenomenon is the presence of the weight 38 on the resilient member 28 intermediate the weight 34 and the armature portion 32 thereof.

Referring to Fig. 3, it will be seen that when the member 28 is attracted towards the core member 16, the weight 34 will strike the bell 36 and will thereby be prevented from moving any further in a downward direction. However, due to the resiliency of the member 28, the weight 34 will continue to move downwardly to the dotted line position shown in Fig. 3. During the time when the electromagnetic force is changing its direction, the resiliency of member 28 near the point where said member is connected to the bracket 18 will cause the member to be moved upward, and here again, the weight 38 will move with respect to the weight 34. This arrangement causes the weight 34 to be moved with a whipping action and to strike the bell 36 with a sharp blow at a frequency of forty times per second, and at this frequency, each separate ring is clearly audible and a pleasing sound is produced.

Thus it will be seen that a pleasant sounding alternating current bell has been produced by a means which is magnetically extremely simple. Such a bell will be extremely durable and will last practically indefinitely. It is further readily conceivable that the principles of the foregoing invention are readily applicable to other types of devices wherein motion of a driven member is desired at a rate or frequency less than that of the frequency of the driving energy. By way of example, an arrangement quite similar to that illustrated and described may be used to comprise an electric switch which is to be opened and closed at very frequent intervals and, in which example, the weight 34 could be formed so as to constitute a switch contact and another contact member to cooperate therewith would be substituted for the bell 36. Obviously, said contacts would respectively be connected into an electric circuit.

Another example of apparatus in which a principle of this type may be used is in connection with opening and closing a high frequency valve and in this example, the vibrating member 28 would actuate a movable valve member to be substituted for the present weight 34, said movable valve member cooperating with a suitable valve seat, or vice versa.

The afore-mentioned two examples are merely representative of numerous other types of devices wherein the above-described basic principles may be readily utilized for the afore-mentioned purposes.

While the invention has been illustrated and described in its preferred embodiments and has included certain details, it should be understood that the invention is not to be limited to the precise details herein illustrated and described since the same may be carried out in other ways, falling within the scope of the invention as claimed.

What I claim is:

1. In a device of the character described, an electro-magnetic means comprising a fixed core and a coil adapted to be connected to a source of alternating current, an oscillatory member having a portion thereof constructed and arranged to serve as an armature for said electromagnetic means and having a resilient portion extending substantially linearly therefrom, a bell-ringing hammer mounted upon said resilient portion adjacent the outer end thereof, a weight mounted on said resilient portion intermediate the hammer and armature portion, said oscillatory member being tuned to have a natural frequency of oscillation substantially equal to a sub-multiple of the frequency of the alternating current, and a bell mounted in a position to be engaged by said bell-ringing hammer during movement of said oscillatory member, said weight functioning with the resilient portion of the oscillatory member to impart a whipping action thereto, whereby said bell is struck by the bell-ringing hammer with a frequency comprising a sub-multiple of the frequency of said alternating current.

2. In a device of the character described, an electro-magnetic means comprising a fixed core and a coil adapted to be connected to a source of alternating current, an oscillatory member having a rigid portion constructed and arranged to serve as an armature for said means and also having a resilient portion extending substantially linearly therefrom, a bell mounted in proximity to said free end portion, a bell-ringing hammer mounted upon said resilient portion adjacent the outer end thereof, and a weight mounted upon the resilient portion of said member intermediate the bell-ringing hammer and the rigid portion thereof, the natural frequency of said resilient portion and the mass of said weight being so related that when the armature is energized by the electromagnetic means a whipping action is induced in the oscillatory member so as to impart to the hammer a frequency which is a sub-multiple of the frequency of said alternating current and the whipping action being such that said weight will engage the bell with a sharp instantaneous contact.

WILBUR T. HARRIS.

REFERENCES CITED

The following references are of record in the file of this patent:

UNITED STATES PATENTS

| Number | Name | Date |
|---|---|---|
| 196,747 | Edison | Nov. 6, 1877 |
| 824,397 | Word | June 26, 1906 |
| 1,206,988 | Clemens | Dec. 5, 1916 |
| 1,605,653 | Driscole | Nov. 2, 1926 |
| 1,643,270 | Grenier | Mar. 27, 1928 |
| 1,663,809 | Moon | Mar. 27, 1928 |
| 2,063,311 | Guedon | Dec. 8, 1936 |
| 2,418,863 | Barber | Apr. 15, 1947 |